(12) United States Patent
Abarr et al.

(10) Patent No.: US 11,708,791 B1
(45) Date of Patent: Jul. 25, 2023

(54) SYSTEM AND METHOD FOR COMPRESSED AIR ENERGY STORAGE WITH WIDE TEMPERATURE RANGE THERMAL STORAGE

(71) Applicant: Bright Generation Holdings, LLC, Arvada, CO (US)

(72) Inventors: Miles L. Abarr, Boulder, CO (US); Sebastian W. Freund, Unterfoehring (DE); Scott Raymond Frazier, Morrison, CO (US)

(73) Assignee: Bright Generation Holdings, LLC, Arvada, CO (US)

( * ) Notice: Subject to any disclaimer, the term of this patent is extended or adjusted under 35 U.S.C. 154(b) by 0 days.

(21) Appl. No.: 17/457,172

(22) Filed: Dec. 1, 2021

Related U.S. Application Data (60) Provisional application No. 63/199,018, filed on Dec. 2, 2020.

(51) Int. Cl.
| | | |
|---|---|---|
| *F02C 6/16* | (2006.01) | |
| *F02C 6/14* | (2006.01) | |
| *F02C 1/04* | (2006.01) | |

(52) U.S. Cl.
CPC ............... *F02C 6/16* (2013.01); *F02C 1/04* (2013.01); *F02C 6/14* (2013.01); *F05D 2260/42* (2013.01); *Y02E 60/14* (2013.01); *Y02E 60/16* (2013.01)

(58) Field of Classification Search
CPC ... F02C 6/14; F02C 6/16; Y02E 60/14; Y02E 60/16
See application file for complete search history.

(56) References Cited

U.S. PATENT DOCUMENTS

| | | | | |
|---|---|---|---|---|
| 3,869,857 A | * | 3/1975 | Margen | F02C 6/14 |
| | | | | 60/39.181 |
| 5,537,822 A | * | 7/1996 | Shnaid | F02C 6/16 |
| | | | | 60/659 |
| 2005/0178114 A1 | * | 8/2005 | Althaus | F02C 6/16 |
| | | | | 60/407 |
| 2011/0094229 A1 | * | 4/2011 | Freund | F02C 6/16 |
| | | | | 60/773 |
| 2011/0094236 A1 | * | 4/2011 | Finkenrath | F02C 7/10 |
| | | | | 60/39.15 |
| 2011/0100213 A1 | * | 5/2011 | Finkenrath | F02C 1/02 |
| | | | | 60/659 |
| 2011/0127004 A1 | * | 6/2011 | Freund | F02C 6/16 |
| | | | | 165/45 |

(Continued)

FOREIGN PATENT DOCUMENTS

| | | | | | |
|---|---|---|---|---|---|
| GB | | 2493791 A | * | 2/2013 | ............... F02C 6/16 |
| WO | WO-2013057427 A1 | | * | 4/2013 | ............. F01K 25/08 |

*Primary Examiner* — Laert Dounis
(74) *Attorney, Agent, or Firm* — Ziolkowski Patent Solutions Group, SC (57) ABSTRACT

A system for air compression, storage and expansion may include a low-pressure and a high-pressure compressor, a motor, a heat storage, an air storage volume, a high-pressure and a low-pressure turbine, and a generator. The system may further include a first air path connecting sequentially the low-pressure compressor, the heat storage, the high-pressure compressor, and the air storage volume. The system may further include a second air path connecting sequentially the air storage volume, the high-pressure turbine, the heat storage, and the low-pressure turbine.

17 Claims, 5 Drawing Sheets

(56) References Cited

U.S. PATENT DOCUMENTS

2012/0102937 A1* 5/2012 Anikhindi .................. F02C 6/16
 60/413
2018/0119613 A1* 5/2018 Macnaghten ............. F02C 6/16

* cited by examiner

SYSTEM AND METHOD FOR COMPRESSED AIR ENERGY STORAGE WITH WIDE TEMPERATURE RANGE THERMAL STORAGE

CROSS-REFERENCE TO RELATED APPLICATION

The present application is a non-provisional of, and claims priority to, U.S. Provisional Patent Application Ser. No. 63/199,018, filed Dec. 2, 2020, the disclosure of which is incorporated herein by reference in its entirety.

BACKGROUND OF THE INVENTION

Embodiments of the present invention relate to a system of power plant components for electricity storage using compressed air and heat and a method for storing electricity in the forms of heat and pressurized air.

Electricity is generated at the same rate and in the same instance of time that it is consumed. However, this balance of supply and demand can come under pressure when unplanned supply e.g. from volatile renewable sources exceeds demand or vice versa. A solution for improving the balance in the electricity grid and enabling integration of more renewables is electricity storage. This works by using electricity supplied by the grid at times when more generation capacity is available than there is consumer demand and the market price is low, storing this electricity by conversion into storable forms of energy in an electricity storage plant, and releasing the energy by generating electricity and supplying it to the market at a later time with higher prices and demand. To maximize the economics of operating an electricity storage plant, the efficiency of the process must be optimized i.e. the losses involved in energy conversion steps must be minimized as far as reasonably possible and the capital expenditure for building storage plants should be minimized.

Compressed air energy storage (CAES) has been used as one of the various technologies for electricity storage plants. Motors drive compressors that fill large, often underground, volumes with compressed air, which is later released from the store through turbines driving generators. During compression the air is preferably cooled, and during expansion it is usually heated to permit operation within material limits and achieve a desired performance. However, first cooling and later heating the air in the process requires additional energy input and increases operating costs. The CAES system suffers from limited efficiency of around 50% when the heat of compression is dissipated. To overcome this disadvantage and reduce the additional energy input for heating the air during expansion, Adiabatic (A-) CAES has been conceptualized according to embodiments of the invention, where the heat of compression is stored in a heat storage, by cooling the air and heating the storage, and later used for heating the air during expansion by cooling the storage. Such ACAES systems can theoretically achieve efficiencies around 70%, and embodiments of the invention reduce cost and engineering challenges associated with heat storage. Embodiments of the current invention described here aim to reduce cost and improve efficiency of ACAES.

BRIEF DESCRIPTION OF THE INVENTION

A system and method for electricity storage with compressed air in conjunction with heat storage is presented. Air is compressed by using grid electricity and stored in a large volume, to be released later in a turbine generating electricity for the grid. Compressed air energy storage systems may not, or not efficiently, use the heat of compression for the turbine, limiting the overall efficiency. The novelty of this invention may include an arrangement of the heat storage such that the heat of air leaving a low pressure compressor is stored, and cold air below ambient temperature is fed to a high-pressure compressor in a charge mode when electricity is consumed, while during discharge for electricity generation a high-pressure turbine expands cold air to very low temperatures, to be heated in the heat storage before expansion in a low-pressure turbine. Thus, the heat storage undergoes the largest temperature difference in the system and is used most effectively. The heat storage may be a solid regenerator of packed bed or tube-in-concrete type suitable for high temperatures. Furthermore, a dehumidifier can be integrated according to embodiments of the invention to periodically remove moisture from the air entering the compressor and regenerate the dehumidifying agent with compressor waste heat.

Various other features and advantages will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION OF THE PREFERRED EMBODIMENT

Embodiments of the present invention include a system and method to store electric energy using heat and compressed air.

An embodiment of the energy storage system is a compressed air energy storage (CAES) power plant, in which one or more electric motor-driven compressors take ambient air and, after cooling the air and storing some of the heat of compression in a heat storage, store the compressed air in an air storage volume, and in which turbines drive one or more generators to expand air from the air storage volume at high pressure to ambient pressure while the air is heated in the heat storage. Electricity is consumed by the electric motors during a charge phase of the electricity storage cycle and later produced in the generators during a discharge phase.

Figure 1:
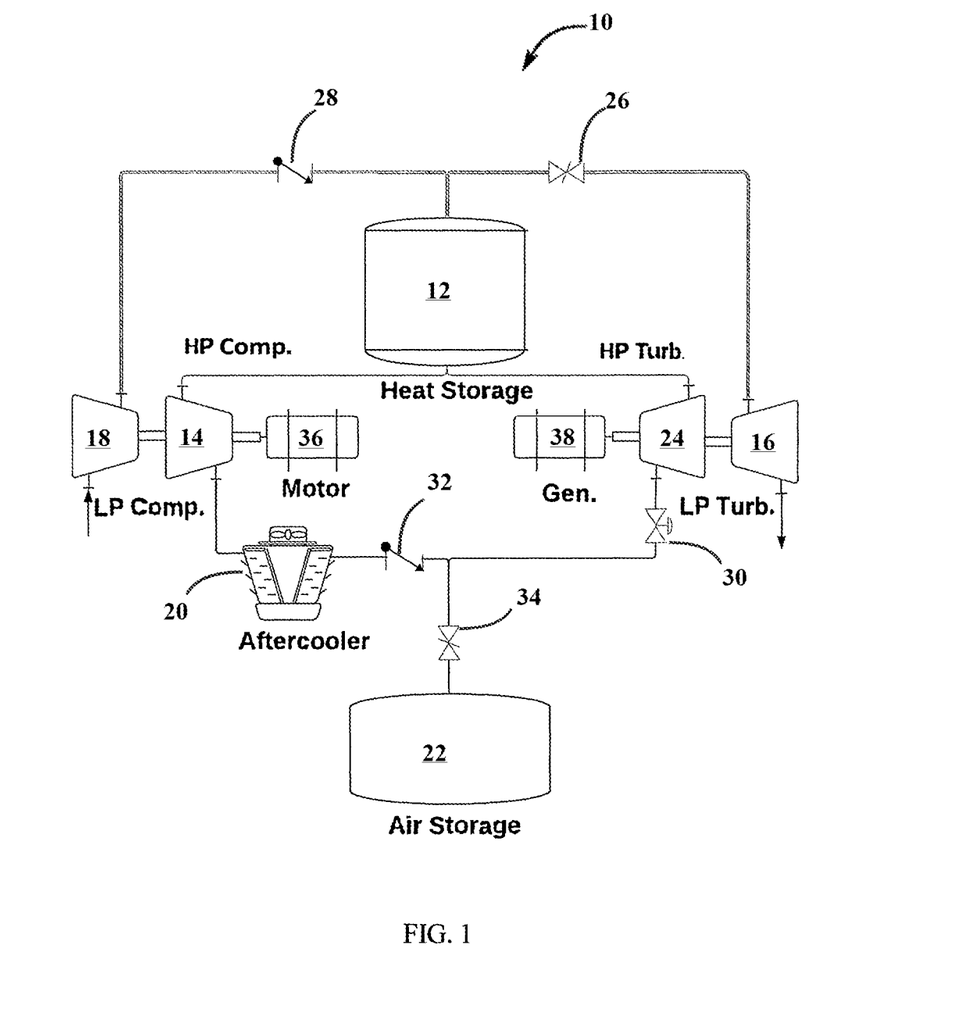
FIG. 1 is a process flow diagram of an energy storage system, according to an embodiment of the invention.

The ratio of electricity produced over electricity consumed is the roundtrip efficiency of the energy storage power plant and for economic reasons should be as high as practical under consideration of the required engineering efforts and capital expenditure. Referring to FIG. 1, the "Adiabatic" CAES plant 10 aims to improve this efficiency by reusing heat from the compression and stored in a heat storage 12 to heat the air during expansion and avoid needing much extra fuel; efficiencies around 70% are theoretically possible. One aspect of the present invention is the heat storage configured in such way that it significantly improves the efficiency of the CAES plant by providing cold air to the high-pressure compressor 14 during the charge phase and hot air to the low-pressure turbine 16 during the discharge phase.

The heat storage 12 in one embodiment may be a packed bed regenerator, a vessel filled with porous material through which hot air passes from the hot end in one direction to the cold end during the charge phase, and cold air passes from the cold end in the other direction to the hot end during the discharge phase. In another embodiment, the heat storage 12 may be a solid regenerator, material with long channels inside through which the air passes in the same way from a hot end to a cold end and vice versa. In one specific embodiment of a solid regenerator heat storage, multiple heat storage units made of concrete and steel pipes are connected in series and/or in parallel, such that the air heats the concrete during the charge phase while flowing through the units in one direction, and cools the concrete during the discharge phase while flowing in the other direction. In an alternate embodiment, the heat storage 12 can comprise an air-to-fluid heat exchanger, with the fluid storing the heat as a hot fluid one tank and a cold fluid in another tank, being pumped from the cold tank to the cold end of the heat exchanger near or below ambient temperatures and from the hot end to the hot tank at for instance 300° C. to 400° C. during the charge and back during the discharge phase to cool or heat the air, respectively. The fluid may be an organic liquid, a molten salt or an aqueous solution; several heat exchangers and different fluids may be used to cover wide temperature ranges.

In the preferred embodiment of the energy storage system, the hot end of the heat storage 12 is coupled to the low-pressure compressor 18 and charged with hot air at an intermediate pressure of for instance 15 bar and a temperature of for instance 400° C. The temperature of the air is a function of the pressure ratio and efficiency of the low pressure compressor 18 and the ambient temperature, which may depend upon specific location but could be in the range from e.g. −10° C. to 30° C. Higher LP compressor pressure ratios or higher ambient temperatures increase the temperature in the heat storage 12. The hot air passes through the heat storage 12 and heats the material of the heat storage while being cooled, and leaves the heat storage at a low temperature of for instance −30° C. at the cold end. Thus, the heat storage 12 preferably works within the largest conceivable temperature range of the CAES system. The cold end of the heat storage 12 is coupled to the high-pressure compressor 14, where the cold air is further compressed before being cooled to near ambient temperature in an air cooler 20 and stored in the air storage volume 22 at a pressure of for instance 70 bar. The cold end of the heat storage 12 is also coupled to the outlet of the high-pressure turbine 24, from which it receives cold air expanded to an intermediate pressure during the discharge phase of for instance 20 bar, at a temperature of for instance −40° C. This temperature is dictated by the pressure ratio of the HP expander 24—higher pressure ratios make this temperature colder. The temperature may increase during operation when the pressure of the air storage volume declines. This air is heated in the heat storage 12 up to for instance 400° C. and leaves the hot end that is coupled to the low-pressure turbine 16 to be expanded to ambient pressure. A TES that has both a hot portion and cold section may provide both of the following values— captures heat of the LP compression for use in discharge and also lowers the temperature of the air entering the HP compressor 14 reducing the work of that compressor and improving round trip efficiency.

For the CAES power plant as an embodiment of the energy storage system to function in distinct charge and discharge phases, the air must be directed in the right direction in pipes and connections and to the right components, also the flow rate to the turbines 16, 24 should be controlled and the air storage volume safely closed. Multiple valves are provided for these reasons, and amongst the main valves preferred are a valve 26 that closes the path of air from the hot side of the heat storage 12 to the low-pressure turbine 16 during charge, a valve 28 that closes the path from the low-pressure compressor 18 to the hot end of the heat storage 12 during discharge, a valve 30 that closes the inlet to the high-pressure turbine 24 during charge, and a valve 32 that closes the path from the high-pressure compressor 14 via the air cooler 20 to the air storage volume 22 during discharge. Another valve 34 could be at the inlet to the air storage 22 to prevent high-pressure air from pressurizing the rest of the energy storage system during standstill or maintenance phases.

Figure 2:
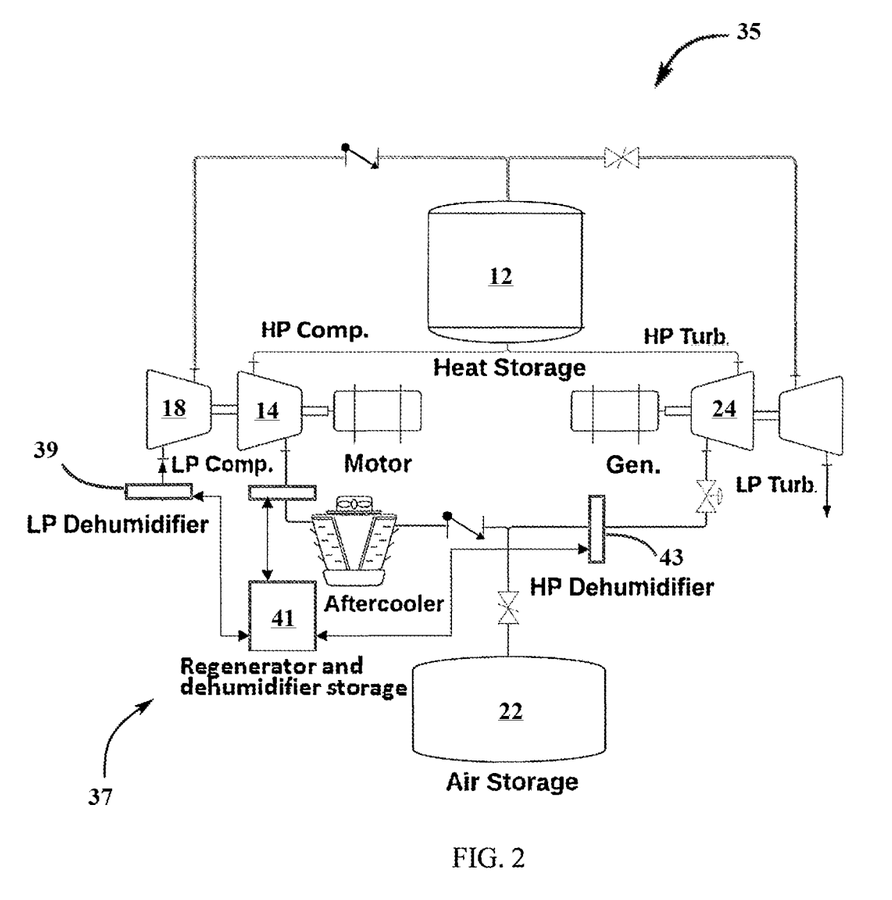
FIG. 2 is a process flow diagram of an energy storage system having a dehumidification system, according to an embodiment of the invention.

Referring now to FIG. 2, a process flow diagram of a compressed air energy storage system 35 having an integrated dehumidifying system 37 is shown, in accordance with an embodiment of the invention. The integrated dehumidifying system 37 is preferable for use with embodiments of the heat storage system 12 having a cold end that may operate at very low temperatures (e.g. below the freezing point of water). This system 37 comprises a drying unit 39 to remove moisture from the ambient intake air of the low-pressure compressor 18 by using moisture absorbing or adsorbing liquids or solids in the drying unit, e.g. glycols or silica gel. These liquids or solids are regenerated after use by removing the moisture with heat taken from the high-pressure compressor 14 discharge air conveyed into the moisture desorber or regenerator 41 of the dehumidifying system 37. Here the liquids or solids are indirectly heated and the moisture is boiled off, before they are used in the drying unit 39. The dehumidifying system 37 may further comprise another drying unit 43 to remove moisture from the air coming out of the air storage volume 22 during the discharge phase. By drying the air before it is cooled below the freezing point in the heat storage 12 during the charge phase and in the turbine 24 during the discharge phase, frost buildup in the heat storage, piping, compressor and turbine components is prevented.

Regarding the heat storage system, two methods are presented to temporarily increase the temperature of the pipes and surfaces of the cold side of the heat storage 12 above the freezing point of water to melt and remove any frost from humidity in the air that may have formed and could increase pressure loss and decrease heat transfer during the charge phase. One method is to increase the air flow rate coming from the hot low-pressure compressor discharge and passing through one or more of a plurality of parallel heat storage units (e.g. 50% increase) above the average flow rate in these units by reducing the flow rate in other units for a short amount of time (e.g. 30 min). Another method is to increase the charge time (e.g. by 1 hr) such that the hot low-pressure compressor discharge air heats the cold side of the heat storage units above the freezing point of water and leaves the heat storage units at a temperature significantly above the time average and above the freezing point of water.

Figure 3:
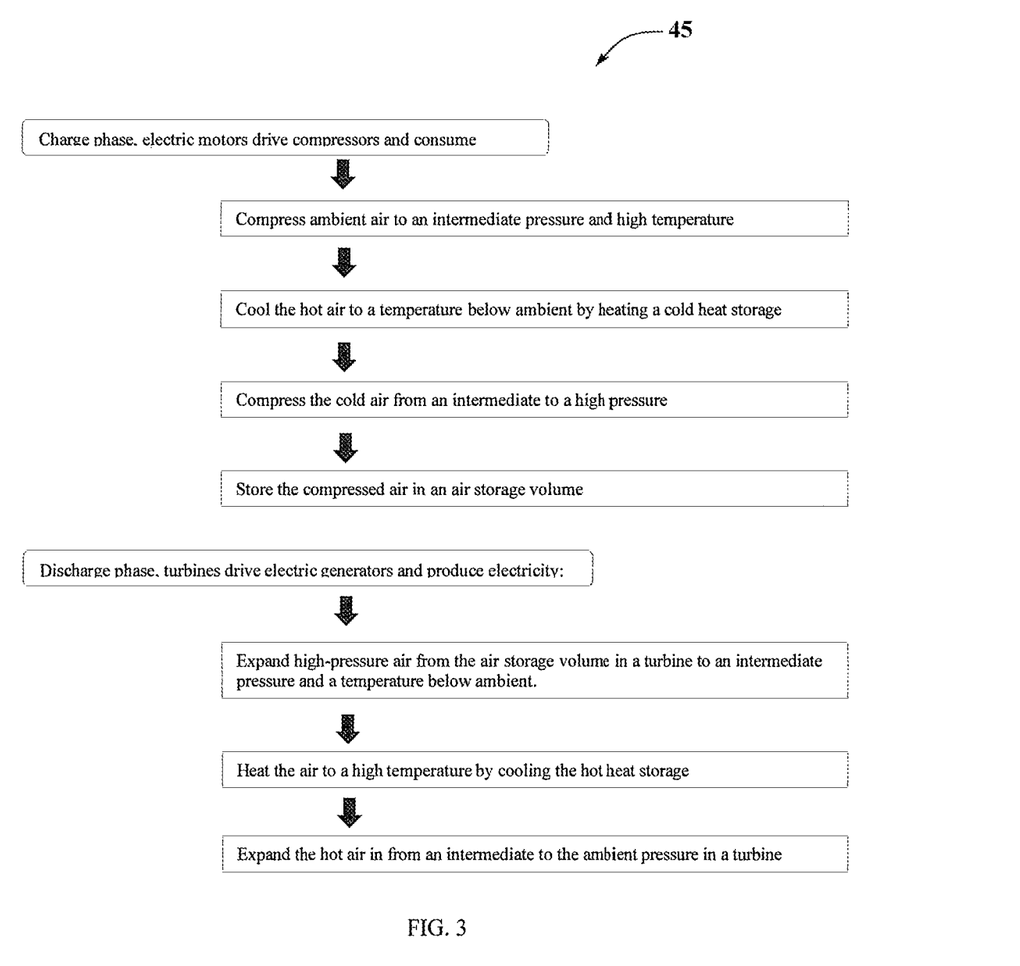
FIG. 3 is a flowchart illustrating steps in a process to store electricity by means of compressed air and heat, according to an embodiment of the invention.

Referring now to FIG. 3, a flow chart showing steps in a novel method 45 to store electric energy by compressing and expanding air with electricity consuming compressors and electricity generating turbines and the efficient use of the heat of compression and the cold of expansion in a heat storage is illustrated, in accordance with an embodiment of the invention. The method of FIG. 3 may be performed by operating components described an illustrated above with respect to FIGS. 1-2.

In accordance with an embodiment of the method, during times where electricity is to be stored, the charge phase, a first compressor 18 driven by an electric motor 36 is run to compress ambient air to a high temperature. The heat from this compressed air is stored in a heat storage system 12 and the air is cooled to a very low temperature. A second compressor 14 driven by an electric motor 36 is run to compress the very cold air to a high pressure, before the compressed air is cooled and stored in an air storage volume 22. During times where electricity is to be generated, the discharge phase, compressed air from the air storage volume 22 is let into a first turbine 24, where it is expanded to a very low temperature, and subsequently used to cool the heat storage system 12, before the heated air is expanded in a second turbine 16 to ambient pressure. The rate of air taken from the air storage volume 22 determines together with the temperature of the heat storage 12 the power generated by the turbines 16, 24 and generators 38.

The method may further include dehumidifying ambient air prior to compression and compressed air prior to expansion, thus avoiding frost buildup when cooling the air, and regenerating the dehumidifying means by desorbing the moisture using heat from the warm discharge air of the second compressor 14. For example, one embodiment of the invention includes dehumidification and a condensate drain. According to one embodiment, the pressure ratio of the low-pressure turbine 16 may be raised above that of the low-pressure compressor 18 to mitigate the cold temperature impact on component material and freezing/frost buildup.

Figure 4:
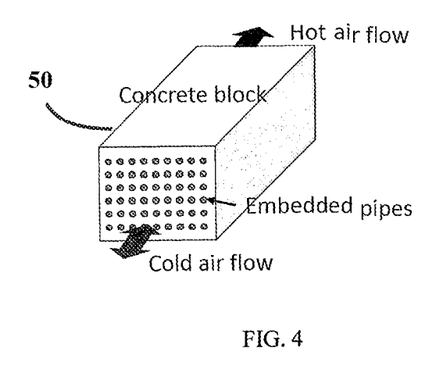
FIG. 4 is a perspective view of a tube-in-concrete block heat storage unit, according to an embodiment of the invention.
Figure 5:
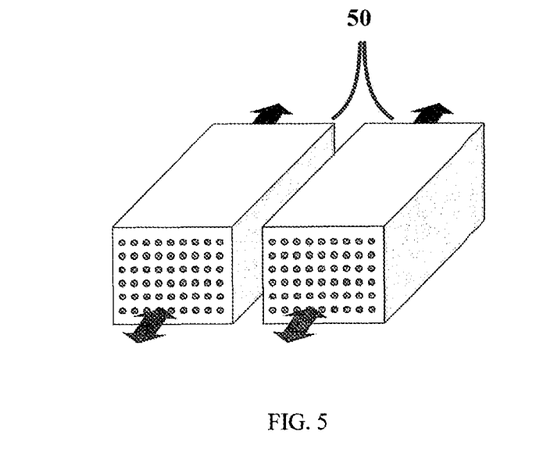
FIG. 5 is a perspective view of a parallel arrangement of two tube-in-concrete block heat storage units, according to an embodiment of the invention.
Figure 6:
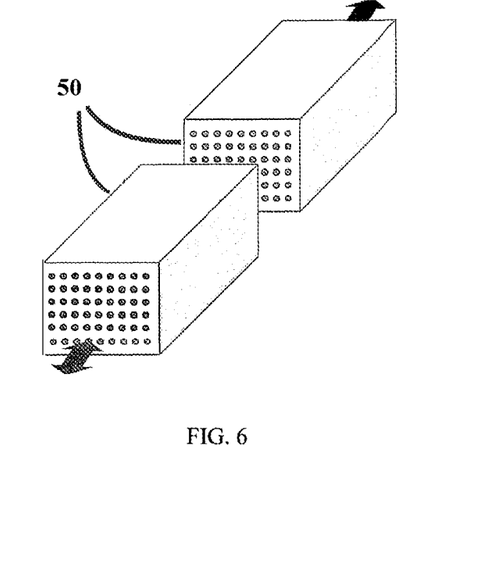
FIG. 6 is a perspective view of a serial arrangement of two tube-in-concrete block heat storage units, according to an embodiment of the invention.

Referring now to FIG. 4, a perspective view of a tube-in-concrete block heat storage unit 50 is shown, according to an embodiment of the invention. FIG. 5 shows a parallel arrangement of two tube-in-concrete block heat storage units 50, according to an embodiment of the invention. FIG. 6 shows a serial arrangement of two tube-in-concrete block heat storage units 50, according to an embodiment of the invention.

Figure 7:
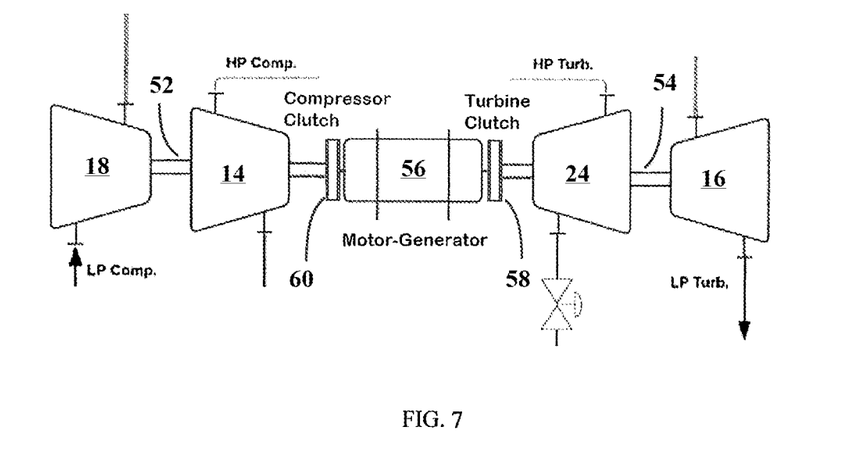
FIG. 7 is a process flow diagram of a motor-generator and clutch system coupled to a compressor stage and a turbine stage of an energy system, according to an embodiment of the invention.

Referring now to FIG. 7, a process flow diagram of a motor-generator and clutch system coupled to a compressor stage and a turbine stage of an energy system is shown, according to an embodiment of the invention. The low-pressure compressor 18 and the high-pressure compressor 14 are shown coupled together to one common drive shaft 52, and the high-pressure turbine 24 and the low-pressure turbine 16 are shown coupled together to another common drive shaft 54. A motor and a generator are combined into a single electrical machine 56. The single electrical machine 56 may be coupled to the drive shaft 54 of the turbines 16, 24 via a turbine clutch 58 and may be coupled to the drive shaft 52 of the compressors 14, 18 via a compressor clutch 60.

Therefore, according to one embodiment of the invention, a system for air compression, storage and expansion may include a low-pressure and a high-pressure compressor, a motor, a heat storage, an air storage volume, a high-pressure and a low-pressure turbine, and a generator. The system may further include a first air path connecting sequentially the low-pressure compressor, the heat storage, the high-pressure compressor, and the air storage volume. The system may further include a second air path connecting sequentially the air storage volume, the high-pressure turbine, the heat storage, and the low-pressure turbine.

According to another embodiment of the invention, a dehumidifying system for a compressed air energy storage plant may be configured to remove moisture from ambient air during a charge phase before compression by means of an absorbent or adsorbent brought in contact with the ambient air, and to regenerate the absorbent or adsorbent to remove the moisture using heat from air discharged by a high-pressure compressor.

According to yet another embodiment of the invention, a method for storing electricity may include running a motor driving a low-pressure compressor to compress air during a charge phase, cooling the compressed air at an intermediate pressure in a heat storage by heating the heat storage, and pressurizing the cooled air in a high-pressure compressor before storing the compressed air in an air storage volume. The method may further include, during a discharge phase, expanding compressed air from the air storage volume in a high-pressure turbine to an intermediate pressure and thereby cooling the air, heating the air in the heat storage by cooling the heat storage, and then expanding the heated air further in a low-pressure turbine, while both the high-pressure and low-pressure turbines drive a generator to produce electricity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for air compression, storage and expansion comprising:
   a low-pressure and a high-pressure compressor;
   a motor;
   a heat storage;
   an air storage volume;
   a high-pressure and a low-pressure turbine;
   a generator;
   a first air path connecting the low-pressure compressor with the heat storage, then with the high-pressure compressor, and then with the air storage volume; and
   a second air path connecting the air storage volume with the high-pressure turbine, then with the heat storage, and then with the low-pressure turbine;
   wherein the compressors and turbines are configured such that the low-pressure compressor has a higher pressure ratio than the high-pressure compressor and the low-pressure turbine has a higher pressure ratio than the low-pressure compressor.

2. The system of claim 1, in which during a charge phase the low-pressure compressor is driven by the motor and configured to compress ambient air to an intermediate pressure and convey this hot compressed air to the heat storage, where it is cooled below typical ambient temperatures, and after which it is compressed to a high pressure in the high-pressure compressor, before stored in the air storage volume.

3. The system of claim 1, in which during a discharge phase the high-pressure turbine driving the generator is configured to receive air at a high pressure from the air storage volume and convey cold expanded air at a temperature below typical ambient temperature and at an intermediate pressure to the heat storage, where the air is heated while the heat storage is cooled, and the hot air is expanded in the low-pressure turbine driving the generator or another generator before released to the ambient.

4. The system of claim 1, in which the heat storage comprises one or more heat storage units configured to receive hot air at an intermediate pressure from the low-pressure compressor and cool this air flowing in one direction during a charge phase by heating storage material inside the heat storage units, and to receive cold air at an intermediate pressure and heat this air flowing in the other direction during a discharge phase by cooling the material inside the heat storage units;

wherein the cold air at an intermediate pressure is supplied from the air storage volume through expansion by the high-pressure turbine and has a temperature below typical ambient temperatures to cool the heated storage material inside the heat storage units to a similar temperature.

5. The system of claim 4, where each heat storage unit is a type of solid regenerative heat storage, in which the storage material is heated by hot air flowing in one direction or cooled by cold air flowing into the other direction, such that one side of the heat storage unit assumes a hot temperature while the other side assumes a cold temperature, while material in between these sides changes temperature between hot after the charge phase and cold after the discharge phase.

6. The system of claim 5, where the regenerative heat storage is made from concrete and steel piping.

7. The system of claim 1, in which a heat exchanger for cooling high-pressure air is placed in the first air path between the high-pressure compressor and the air storage volume.

8. The system of claim 1, where the compressors are coupled together to one common drive shaft and the turbines are coupled together to another common drive shaft.

9. The system of claim 1, where the motor and the generator are combined into a single electrical machine, coupled to drive shafts of the turbines and compressors via clutches.

10. A method to operate the heat storage according to claim 5 in a compressed air energy storage plant during the charge phase in such a way, that in at least one of a plurality of parallel heat storage units, for an amount of time significantly shorter than the charge time from empty to full of the air storage volume, the flow rate of hot compressed air flow entering the heat storage from the low-pressure compressor is increased significantly above the time average of air flow rate, thereby temporarily heating heat storage pipes and surfaces sufficiently to melt and remove frost formation.

11. A method to operate the heat storage according to claim 5 in a compressed air energy storage plant during the charge phase in such a way, that the duration of flowing hot compressed air flow through the heat storage from the low pressure compressor is sufficient to heat the pipes and surfaces of the heat storage above the freezing point of water to melt and remove frost formation.

12. The method of claim 10 in which electricity is consumed during the charge phase in response to a low electricity market price signal or a low relative electricity demand, or to a contractual schedule; and in which electricity is generated during a discharge phase in response to a high electricity market price signal or a high relative electricity demand, or to a contractual schedule.

13. The system of claim 2 wherein the high-pressure compressor is driven by the motor or another motor.

14. The system of claim 3 wherein the high-pressure turbine is configured to convey the cold expanded air at a temperature below the freezing point of water to the heat storage.

15. A method to operate a heat storage in a compressed air energy storage plant during a charge phase in such a way, that in at least one of a plurality of parallel heat storage units, for an amount of time significantly shorter than the charge time from empty to full of an air storage volume, the flow rate of hot compressed air flow entering the heat storage from a low-pressure compressor is increased significantly above the time average of air flow rate, thereby temporarily heating heat storage pipes and surfaces sufficiently to melt and remove frost formation;

wherein each heat storage unit is a type of solid regenerative heat storage, in which storage material inside the heat storage units is heated by hot air flowing in one direction or cooled by cold air flowing into the other direction, such that one side of the heat storage unit assumes a hot temperature while the other side assumes a cold temperature, while material in between these sides changes temperature between hot after the charge phase and cold after a discharge phase.

16. The method of claim 15 in which electricity is consumed during the charge phase in response to a low electricity market price signal or a low relative electricity demand, or to a contractual schedule; and in which electricity is generated during the discharge phase in response to a high electricity market price signal or a high relative electricity demand, or to a contractual schedule.

17. The method of claim 15 further comprising:
running a motor driving the low-pressure compressor to compress air during the charge phase,
cooling the hot compressed air at an intermediate pressure in the heat storage and heating the same, and
pressurizing the cold air in a high-pressure compressor before storing the compressed air in the air storage volume; and
during the discharge phase, expanding compressed air from the air storage volume in a high-pressure turbine to an intermediate pressure and thereby cooling the air, and
heating the air in the heat storage by cooling the same, before expanding the hot air further in a low-pressure turbine, while both turbines are driving a generator to produce electricity.

* * * * *